United States Patent [19]

Castner

[11] Patent Number: 5,100,982
[45] Date of Patent: Mar. 31, 1992

[54] TECHNIQUE FOR REDUCING THE MOLECULAR WEIGHT AND BROADENING THE MOLECULAR WEIGHT DISTRIBUTION OF HIGH CIS-1,4-POLYBUTADIENE

[75] Inventor: Kenneth F. Castner, Uniontown, Ohio

[73] Assignee: The Goodyear Tire & Rubber Company, Akron, Ohio

[21] Appl. No.: 636,861

[22] Filed: Jan. 2, 1991

[51] Int. Cl.$^5$ ............................ C08F 4/26; C08F 36/06
[52] U.S. Cl. .................................... 526/143; 526/137; 526/142; 526/340.4; 526/903
[58] Field of Search ............ 526/143, 137, 142, 340.4, 526/903

[56] References Cited

U.S. PATENT DOCUMENTS

| | | | |
|---|---|---|---|
| 3,681,315 | 8/1972 | Yagi et al. | 526/143 |
| 3,843,618 | 10/1974 | Yagi et al. | 526/143 X |
| 3,962,375 | 6/1976 | Throckmorton et al. | 526/137 X |
| 3,985,941 | 10/1976 | Pierson et al. | 526/137 |

*Primary Examiner*—Fred Teskin
*Attorney, Agent, or Firm*—Alvin T. Rockhill

[57] ABSTRACT

High cis-1,4-polybutadiene can be synthesized by polymerizing 1,3-butadiene monomer with a three component nickel catalyst system containing (a) an organonickel compound, (b) an organoaluminum compound, and (c) a fluorine containing compound. However, the molecular weight of the high cis-1,4-polybutadiene prepared is typically too high to be utilized as a non-oil extended rubber. This invention is based upon the discovery that halogenated phenols act to reduce the molecular weight and to increase the molecular weight distribution of high cis-1,4-polybutadiene prepared with such nickel based catalyst systems. The use of halogenated phenols as modifiers in such polymerizations does not change the microstructure of the high cis-1,4-polybutadiene produced. Accordingly, the present invention specifically discloses a process for producing high cis-1,4-polybutadiene having a reduced molecular weight and broad molecular weight distribution which comprises polymerizing 1,3-butadiene in the presence of (a) an organonickel compound, (b) an organoaluminum compound, (c) a fluorine containing compound, and (d) a halogenated phenol.

11 Claims, No Drawings

TECHNIQUE FOR REDUCING THE MOLECULAR WEIGHT AND BROADENING THE MOLECULAR WEIGHT DISTRIBUTION OF HIGH CIS-1,4-POLYBUTADIENE

BACKGROUND OF THE INVENTION

High cis-1,4-polybutadiene can be prepared by polymerizing 1,3-butadiene monomer with nickel based catalyst systems. Such nickel based catalyst systems contain (a) an organonickel compound, (b) an organoaluminum compound, and (c) a fluorine containing compound. Such nickel based catalyst systems and their use in the synthesis of high cis-1,4-polybutadiene is described in detail in U.S. Pat. No. 3,856,764, U.S. Pat. No. 3,910,869, and U.S. Pat. No. 3,962,375.

The high cis-1,4-polybutadiene prepared utilizing such nickel based catalyst systems typically has a high molecular weight. Due to this high molecular weight, the high cis-1,4-polybutadiene is generally oil extended. However, this precludes the high cis-1,4-polybutadiene from being utilized in many applications. For instance, such oil extended rubbers cannot be utilized in tire sidewalls which contain white sidewall compounds. In any case, there is a large demand for high cis-1,4-polybutadiene having a reduced molecular weight which can be processed without being oil extended.

Various compounds have been found to act as molecular weight reducing agents when used in conjunction with the nickel based catalyst system. For instance, Australian Patent 556,294 discloses that alpha-olefins, such as ethylene and propylene, act as molecular weight reducing agents when utilized in conjunction with such three component nickel catalyst systems. Canadian Patent 1,236,648 indicates that 1-butene, isobutylene, cis-2-butene, trans-2-butene, and allene act as molecular weight regulators when used in conjunction with such nickel based catalyst systems. U.S. Pat. No. 4,383,097 reveals that certain nonconjugated diolefins, such as 1,4-pentadiene, 1,6-heptadiene, and 1,5-hexadiene, act as molecular weight reducing agents when utilized in conjunction with such catalyst systems.

The processibility of high cis-1,4-polybutadiene rubbers can be improved by simply lowering their molecular weight. However, this approach also typically leads to increased cold flow. Accordingly, the use of conventional molecular weight reducing agents to improve rubber processibility leads to compromised cold flow characteristics.

SUMMARY OF THE INVENTION

It has been unexpectedly found that halogenated phenols act as molecular weight reducing agents when employed in conjunction with nickel based catalyst systems which contain (a) an organonickel compound, (b) an organoaluminum compound, and (c) a fluorine containing compound. It has further been discovered that halogenated phenols also act to increase the molecular weight distribution of high cis-1,4-polybutadiene rubbers prepared in their presence utilizing such nickel based catalyst systems. This means that halogenated phenols can be employed in conjunction with such nickel based catalyst systems to reduce the molecular weight of the rubber without sacrificing cold flow characteristics.

The subject invention more specifically discloses a process for producing high cis-1,4-polybutadiene having a reduced molecular weight and broad molecular weight distribution which comprises polymerizing 1,3-butadiene in the presence of (a) an organonickel compound, (b) an organoaluminum compound, (c) a fluorine containing compound, and (d) a halogenated phenol.

The present invention also reveals in the process for producing high cis-1,4-polybutadiene by polymerizing 1,3-butadiene monomer with a catalyst system containing (a) an organonickel compound, (b) an organoaluminum compound, and (c) a fluorine containing compound; the improvement which comprises conducting said process in the presence of a halogenated phenol which acts to reduce the molecular weight and to increase the molecular weight distribution of the high cis-1,4-polybutadiene.

DETAILED DESCRIPTION OF THE INVENTION

The polymerizations of this invention will typically be carried out as solution polymerizations in a hydrocarbon solvent which can be one or more aromatic, paraffinic, or cycloparaffinic compounds. These solvents will normally contain from 4 to about 10 carbon atoms per molecule and will be liquids under the conditions of the polymerization. Some representative examples of suitable organic solvents include isooctane, cyclohexane, normal hexane, benzene, toluene, xylene, ethylbenzene, and the like, alone or in admixture.

The halogenated phenols of this invention will also act as molecular weight reducing agents in bulk polymerizations which are carried out with nickel based catalyst systems containing (a) an organonickel compound, (b) an organoaluminum compound, and (c) a fluorine containing compound. Such bulk polymerizations are described in detail in British Patent 2,186,880. The teachings of British Patent 2,186,880 are incorporated herein by reference in their entirety.

In the solution polymerizations of this invention, there will normally be from about 5 to about 35 weight percent monomers in the polymerization medium. Such polymerization media are, of course, comprised of the organic solvent and the 1,3-butadiene monomer. As the polymerization proceeds, monomer is converted to polymer and accordingly the polymerization medium will contain from about 5 to about 35 weight percent unreacted monomers and polymer. In most cases, it will be preferred for the polymerization medium to contain from about 10 to about 30 weight percent monomers and polymers. It is generally more preferred for the polymerization medium to contain from 20 to 25 weight percent monomers and polymers.

Polymerization is typically started by simply adding the nickel based catalyst system and the halogenated phenol to the polymerization medium. Such polymerizations can be carried out utilizing batch, semi-continuous, or continuous techniques. In a continuous process additional 1,3-butadiene monomer, catalyst, halogenated phenol, and solvent are added to the reaction zone at the same rate as polymer, solvent, and residual reactants are removed from the reaction zone.

The halogenated phenols which are utilized in accordance with this invention have the structural formula:

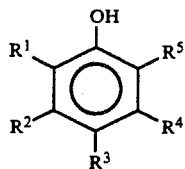

wherein $R^1$, $R^2$, $R^3$, $R^4$, and $R^5$ can be the same or different and represent hydrogen or a halogen, with the proviso that at least one member selected from the group consisting of $R^1$, $R^2$, $R^3$, $R^4$, and $R^5$ is a halogen. The halogen will typically be selected from the group consisting of fluorine, chlorine, bromine, and iodine. However, the halogen will typically be selected from the group consisting of fluorine, chlorine, and bromine. Some representative examples of halogenated phenols which can be employed include pentafluorophenol, pentachlorophenol, pentabromophenol, para-fluorophenol, para-chlorophenol, para-bromophenol, meta-fluorophenol, meta-chlorophenol, ortho-chlorophenol, ortho-bromophenol, ortho-fluorophenol, and meta-bromophenol. For economic and environmental reasons, para-chlorophenol is typically preferred.

The organoaluminum compound that can be utilized has the structural formula:

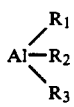

in which $R^1$ is selected from the group consisting of alkyl groups (including cycloalkyl), aryl groups, alkaryl groups, arylalkyl groups, alkoxy groups, hydrogen and fluorine; $R^2$ and $R^3$ being selected from the group consisting of alkyl groups (including cycloalkyl), aryl groups, alkaryl groups, and arylalkyl groups. Some representative examples of organoaluminum compounds that can be utilized are diethyl aluminum hydride, di-n-propyl aluminum hydride, di-n-butyl aluminum hydride, diisobutyl aluminum hydride, diphenyl aluminum hydride, di-p-toly aluminum hydride, dibenzyl aluminum hydride, phenyl ethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride, and benzyl isopropyl aluminum hydride, diethylaluminum ethoxide, diisobutylaluminum ethoxide, dipropylaluminum methoxide, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other triorganoaluminum compounds. The preferred organoaluminum compounds include triethyl aluminum (TEAL), tri-n-propyl aluminum, triisobutyl aluminum (TIBAL), trihexyl aluminum, diisobutyl aluminum hydride (DIBA-H), and diethyl aluminum fluoride.

The component of the catalyst which contains nickel can be any soluble organonickel compound. These soluble nickel compounds are normally compounds of nickel with a mono-dentate or bi-dentate organic ligands containing up to 20 carbon atoms. A ligand is an ion or molecule bound to and considered bonded to a metal atom or ion. Mono-dentate means having one position through which covalent or coordinate bonds with the metal may be formed. Bi-dentate means having two positions through which covalent or coordinate bonds with the metal may be formed. The term "soluble" refers to solubility in butadiene monomer and inert solvents.

Generally, any nickel salt or nickel containing organic acid containing from about 1 to 20 carbon atoms may be employed as the soluble nickel containing compound. Some representative examples of soluble nickel containing compounds include nickel benzoate, nickel acetate, nickel naphthenate, nickel octanoate, nickel neodecanoate, bis(α-furyl dioxime) nickel, nickel palmitate, nickel stearate, nickel acetylacetonate, nickel salicaldehyde, bis(cyclopentadiene) nickel, bis(salicylaldehyde) ethylene diimine nickel, cyclopentadienyl-nickel nitrosyl, bis($\pi$-allyl nickel), bis($\pi$cycloocta-1,5-diene), bis($\pi$-allyl nickel trifluoroacetate), and nickel tetracarbonyl. The preferred component containing nickel is a nickel salt of a carboxylic acid or an organic complex compound of nickel. Nickel naphthenate, nickel octanoate, and nickel neodecanoate are highly preferred soluble nickel containing compounds. Nickel 2-ethylhexanoate, which is commonly referred to as nickel octanoate (NiOct) is the soluble nickel containing compound which is most commonly used due to economic factors.

The fluorine containing compound utilized in the catalyst system is generally hydrogen fluoride or boron trifluoride. If hydrogen fluoride is utilized, it can be in the gaseous or liquid state. It, of course, should be anhydrous and as pure as possible. The hydrogen fluoride can be dissolved in an inert solvent, and thus, can be handled and charged into the reaction zone as a liquid solution. Optionally, butadiene monomer can be utilized as the solvent. Inert solvents include alkyl-, alkaryl-, arylalkyl-, and aryl-hydrocarbons. For example, benzene and toluene are convenient solvents.

The boron trifluoride component of the catalyst can be gaseous boron trifluoride. It should also be anhydrous and as pure as possible.

The hydrogen fluoride and/or boron trifluoride can also be utilized as complexes in the catalyst system as the fluorine containing compound. Hydrogen fluoride complexes and boron trifluoride complexes can readily be made with compounds which contain an atom or radical which is capable of lending electrons to or sharing electrons with hydrogen fluoride or boron trifluoride. Compounds capable of such associating are ethers, alcohols, ketones, esters, nitriles and water.

The ketone subclass can be defined by the formula

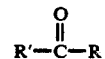

wherein R' and R are selected from the group consisting of alkyl radicals, cycloalkyl radicals, aryl radicals, alkaryl radicals, and arylalkyl radicals containing from 1 to about 30 carbon atoms; and wherein R' and R can be the same or different. These ketones represent a class of compounds which have a carbon atom attached by a double bond to oxygen. Some representative examples of ketones that are useful in the preparation of the ketone-hydrogen fluoride complexes or boron trifluoride complexes of this invention include dimethyl ketone, methylethyl ketone, dibutyl ketone, methyl isobutyl ketone, ethyl octyl ketone, 2,4-pentanedione, butyl cycloheptanone, acetophenone, amylphenyl ketone, butylphenyl ketone, benzophenone, phenyltolyl ketone, quinone and the like. The preferred ketones that can be used to form the ketone-hydrogen fluoride compounds and the ketone-boron trifluoride compounds of this invention are the dialkyl ketones of which acetone is most preferred.

The nitrile subclass can be represented by the formula RCN where R represents alkyl groups, cycloalkyl groups, aryl groups, alkaryl groups or arylalkyl groups that contain up to about 30 carbon atoms. The nitriles contain a carbon atom attached to a nitrogen atom by a triple bond. Representative but not exhaustive of the nitrile subclass are acetonitrile, butyronitrile, acrylonitrile, benzonitrile, tolunitrile, phenylacetonitrile, and the like. The preferred hydrogen fluoride-nitrile complex or boron trifluoride nitrile complex is the hydrogen fluoride benzonitrile complex or the boron trifluoride benzonitrile complex.

The alcohol subclass can be defined by the formula ROH where R represents alkyl radicals, cycloalkyl radicals, aryl radicals, alkaryl radicals, or arylalkyl radicals containing from about 1 to about 30 carbon atoms. These alcohols represent a class of compounds which have a carbon atom attached by a single bond to oxygen which is in turn attached to a hydrogen by a single bond. Representative but not exhaustive of the alcohols useful in the preparation of hydrogen fluoride complexes and boron trifluoride complexes are methanol, ethanol, n-propanol, isopropanol, phenol, benzyl alcohol, cyclohexanol, butanol, hexanol and pentanol. The preferred hydrogen fluoride-alcohol complex or boron trifluoride alcohol complex is hydrogen fluoride phenolate complex or boron trifluoride phenolate complex.

The ether subclass can be defined by the formula R'OR where R and R' represent alkyl radicals, cycloalkyl radicals, aryl radicals, alkaryl radicals, and arylalkyl radicals containing from about 1 to about 30 carbon atoms; wherein R and R' may be the same or dissimilar. The R may also be joined through a common carbon bond to form a cyclic ether with the ether oxygen being an integral part of the cyclic structure such as tetrahydrofuran, furan or dioxane. These ethers represent a class of compounds which have two carbon atoms attached by single bonds to an oxygen atom. Representative but not exhaustive of the ethers useful in the preparation of the hydrogen fluoride complexes or boron trifluoride complexes of this invention are dimethyl ether, diethyl ether, dibutyl ether, diamyl ether, diisopropyl ethers, tetrahydrofuran, anisole, diphenyl ether, ethyl methyl ether, dibenzyl ether and the like. The preferred hydrogen fluoride-ether complexes or boron trifluoride-ether complexes are hydrogen fluoride diethyl etherate, hydrogen fluoride dibutyl etherate, boron trifluoride diethyl etherate, boron trifluoride dibutyl etherate complexes.

The ester subclass can be defined by the formula

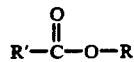

wherein R and R' are selected from the group consisting of alkyl radicals, cycloalkyl radicals, aryl radicals, alkaryl radicals and arylalkyl radicals containing from 1 to about 20 carbon atoms. The esters contain a carbon atom attached by a double bond to an oxygen atom as indicated. Representative but not exhaustive of such esters are ethyl benzoate, amyl benzoate, phenyl acetate, phenyl benzoate and other esters conforming to the formula above. The preferred hydrogen fluoride-ester complex is hydrogen fluoride ethyl benzoate complex. The preferred boron trifluoride-ester complex is boron trifluoride ethyl benzoate complex.

Such complexes are usually prepared by simply bubbling gaseous boron trifluoride or hydrogen fluoride into appropriate amounts of the complexing agent, for instance, a ketone, an ether, an ester, an alcohol, or a nitrile. This should be done in the absence of moisture, and measures should be taken to keep the temperature from rising above about 100° F. (37.7° C.). In most cases, boron trifluoride and hydrogen fluoride complexes are prepared with the temperature being maintained at room temperature. Another possible method would be to dissolve the hydrogen fluoride or the complexing agent in a suitable solvent followed by adding the other component. Still another method of mixing would be to dissolve the complexing agent in a solvent and simply bubble gaseous hydrogen fluoride or boron trifluoride through the system until all of the complexing agent is reacted with the hydrogen fluoride or boron trifluoride. The concentrations can be determined by weight gain or chemical titration.

The three component catalyst system utilized can be preformed. If the catalyst system is preformed, it will maintain a high level of activity over a long period of time. The utilization of such a preformed catalyst system also results in the formation of a uniform polymeric product. Such preformed catalyst systems are prepared in the presence of one or more preforming agents selected from the group consisting of monoolefins, nonconjugated diolefins, conjugated diolefins, cyclic nonconjugated multiolefins, acetylenic hydrocarbons, triolefins, vinyl ethers and aromatic nitriles.

Some representative examples of olefins that can be used as the preforming agent in the preparation of stabilized catalysts are trans-2-butene, mixed cis- and trans-2-pentene, and cis-2-pentene. Some nonconjugated diolefins that can be used as preforming agents are cis-1,4-hexadiene, 1,5-heptadiene, 1,7-octadiene, and the like. Representative examples of cyclic nonconjugated multiolefins that can be used include 1,5-cyclooctadiene, 1,5,9-cyclododecatriene, and 4-vinyl cyclohexene-1. Some representative examples of acetylenic hydrocarbons which can be used as the preforming agent are methyl acetylene, ethyl acetylene, 2-butyne, 1-pentyne, 2-pentyne, 1-octyne, and phenyl acetyene. Triolefins that can be used as the preforming agent include 1,3,5-hexatriene, 1,3,5-heptatriene, 1,3,6-octatriene, 5-methyl-1,3,6-heptatriene and the like. Some representative examples of substituted conjugated diolefins that can be used include 1,4-diphenyl butadiene, myrcene (7-methyl-3-methylene-1,6-octadiene), and the like. Ethyl vinyl ether and isobutyl vinyl ether are representative examples of alkyl vinyl ethers that can be used as the preforming agent. A representative example of an aromatic nitrile that can be used is benzonitrile. Some representative examples of conjugated diolefins that can be used include 1,3-butadiene, isoprene, and 1,3-pentadiene. The preferred preforming agent is 1,3-butadiene.

A method of preparing the preformed catalyst so that it will be highly active and relatively chemically stable is to add the organoaluminum compound and the preforming agent to the solvent medium before they come into contact with the nickel compound. The nickel compound is then added to the solution and then the fluoride compound is added to the solution. As an alternative, the preforming agent and the nickel compound may be mixed, followed by the addition of the organoaluminum compound and then the fluoride compound. Other orders of addition may be used but they generally produce less satisfactory results.

The amount of preforming agent used to preform the catalyst may be within the range of about 0.001 to 3 percent of the total amount of monomer to be polymerized. Expressed as a mole ratio of preforming agent to nickel compound, the amount of preforming agent present during the preforming step can be within the range of about 1 to 3000 times the concentration of nickel. The preferred mole ratio of preforming agent to nickel is about 3:1 to 500:1.

These preformed catalysts have catalytic activity immediately after being prepared. However, it has been observed that a short aging period, for example 15 to 30 minutes, at a moderate temperature, for example 50° C., increases the activity of the preformed catalyst greatly.

In order to properly stabilize the catalyst, the preforming agent must be present before the organoaluminum compound has an opportunity to react with either the nickel compound or the fluoride compound. If the catalyst system is preformed without the presence of at least a small amount of preforming agent, the chemical effect of the organoaluminum upon the nickel compound or the fluoride compound is such that the catalytic activity of the catalyst is greatly lessened and shortly thereafter rendered inactive. In the presence of at least a small amount of preforming agent, the catalytic or shelf life of the catalyst is greatly improved over the system without any preforming agent present.

The three component nickel catalyst system can also be premixed. Such premixed catalyst systems are prepared in the presence of one or more polymeric catalyst stabilizers. The polymeric catalyst stabilizer can be in the form of a monomer, a liquid polymer, a polymer cement, or a polymer solution. Polymeric catalyst stabilizers are generally homopolymers of conjugated dienes or copolymers of conjugated dienes with styrenes and methyl substituted styrenes. The diene monomers used in the preparation of polymeric catalyst stabilizers normally contain from 4 to about 12 carbon atoms. Some representative examples of conjugated diene monomers that can be utilized in making such polymeric catalyst stabilizers include isoprene, 1,3-butadiene, piperylene, 1,3-hexadiene, 1,3-heptadiene, 1,3-octadiene, 2,4-hexadiene, 2,4-heptadiene, 2,4-octadiene and 1,3-nonadiene. Also included are 2,3-dimethylbutadiene, 2,3-dimethyl-1,3-hexadiene, 2,3-dimethyl-1,3-heptadiene, 2,3-dimethyl-1,3-octadiene and 2,3-dimethyl-1,3-nonadiene and mixtures thereof.

Some representative examples of polymeric catalyst stabilizers include polyisoprene, polybutadiene, polypiperylene, copolymers of butadiene and styrene, copolymers of butadiene and α-methylstyrene, copolymers of isoprene and styrene, copolymers of isoprene and α-methylstyrene, copolymers of piperylene and styrene, copolymers of piperylene and α-methylstyrene, copolymers of 2,3-dimethyl-1,3-butadiene and styrene, copolymers of 2,3-dimethyl butadiene and α-methylstyrene, copolymers of butadiene and vinyltoluene, copolymers of 2,3-dimethyl-1,3-butadiene and vinyltoluene, copolymers of butadiene and β-methylstyrene, and copolymers of piperylene and β-methylstyrene.

In order to properly stabilize the catalyst system by this premixing technique, the polymeric catalyst stabilizer must be present before the organoaluminum compound has an opportunity to react with either the nickel compound or the fluorine containing compound. If the catalyst system is premixed without the presence of at least a small amount of polymeric catalyst stabilizer, the chemical effect of the organoaluminum compound upon the nickel compound or the fluoride compound is such that the catalytic activity of the catalyst system is greatly lessened and shortly thereafter rendered inactive. In the presence of at least a small amount of polymeric catalyst stabilizer, the catalytic or shelf life of the catalyst system is greatly improved over the same system without any polymeric catalyst stabilizer present.

One method of preparing this premixed catalyst system so that it will be highly active and relatively chemically stable is to add the organoaluminum compound to the polymer cement solution and mix thoroughly before the organoaluminum compound comes into contact with the nickel containing compound. The nickel compound is then added to the polymer cement solution. Alternatively, the nickel compound can be mixed with the polymer cement first, followed by the addition of the organoaluminum compound. Then the fluorine containing compound is added to the polymer cement solution. This is not intended to preclude other orders or methods of catalyst addition, but it is emphasized that the polymer stabilizer must be present before the organoaluminum compound has a chance to react with either the nickel containing compound or the fluorine containing compound.

The amount of polymeric catalyst stabilizer used to premix the catalyst system can be within the range of about 0.01 to 3 weight percent of the total amount monomer to be polymerized. Expressed as a weight ratio of polymeric catalyst stabilizer to nickel, the amount of polymeric catalyst stabilizer present during the premixing step can be within the range of about 2 to 2000 times the concentration of nickel. The preferred weight ratio of polymeric catalyst stabilizer to nickel is from about 4:1 to about 300:1. Even though such premixed catalyst systems show catalytic activity immediately after being prepared, it has been observed that a short aging period, for example 15 to 30 minutes, at moderate temperatures, for example 50° C., increases the activity of the preformed catalyst system.

A "modified in situ" technique can also be used in making the three component nickel catalyst system. In fact, the utilization of catalysts made by such "modified in situ" techniques results in more uniform control of the polymerization and the polymeric product. In such a "modified in situ" technique, the organoaluminum compound is added to neat 1,3-butadiene monomer with the nickel containing compound being added later. The butadiene monomer containing the organoaluminum compound and the nickel containing compound is then charged into the reaction zone being used for the polymerization with the fluorine containing compound being charged into the reaction zone separately. Normally, the organoaluminum compound and the nickel containing compound are charged into the reaction zone soon after being mixed into the butadiene monomer. In most cases, the organoaluminum compound and the nickel containing compound are charged into the reaction zone within 60 seconds after being mixed in the butadiene monomer. It will generally be desirable to utilize organoaluminum compounds and nickel containing compounds which have been dissolved in a suitable solvent.

The three component nickel catalyst systems utilized in the practice of the present invention have activity over a wide range of catalyst concentrations and catalyst component ratios. The three catalyst components interact to form the active catalyst system. As a result, the optimum concentration for any one component is very dependent upon the concentrations of each of the other two catalyst components. Furthermore, while polymerization will occur over a wide range of catalyst concentrations and ratios, the most desirable properties for the polymer being synthesized are obtained over a relatively narrow range. Polymerizations can be carried out utilizing a mole ratio of the organoaluminum compound to the nickel containing compound within the range of from about 0.3:1 to about 300:1; with the mole ratio of the fluorine containing compound to the organonickel containing compound ranging from about 0.5:1 to about 200:1 and with the mole ratio of the fluorine containing compound to the organoaluminum compound ranging from about 0.4:1 to about 10:1. The preferred mole ratios of the organoaluminum compound to the nickel containing compound ranges from about 2:1 to about 80:1. the preferred mole ratio of the fluorine containing compound to the nickel containing compound ranges from about 3:1 to about 100:1, and the preferred mole ratio of the fluorine containing compound to the organoaluminum compound ranges from about 0.7:1 to about 7:1. The concentration of the catalyst system utilized in the reaction zone depends upon factors such as purity, the reaction rate desired, the polymerization temperature utilized, the reactor design, and other factors.

The three component nickel catalyst system can be continuously charged into the reaction zone utilized in carrying out continuous solution polymerization at a rate sufficient to maintain the desired catalyst concentration. In continuous polymerizations, the halogenated phenol is continuously charged into the reaction zone at a rate sufficient to maintain the desired concentration of the halogenated phenol in the reaction zone. Even though the halogenated phenol is not consumed in the polymerization reaction, a certain amount of the halogenated phenol will need to be continuously added to compensate for losses. The total quantity of the 1,3-butadiene monomer, the catalyst system, the solvent and the halogenated phenol charged into the reaction zone per unit time is essentially the same as the quantity of high cis-1,4-polybutadiene cement withdrawn from the reaction zone within that unit of time. The three catalyst components can be charged into the reaction zone "in situ", or as has been previously described, as a preformed or premixed catalyst system. In order to facilitate charging the catalyst components into the reaction zone "in situ" they can be dissolved in a small amount of an inert organic solvent or butadiene monomer. Preformed and premixed catalyst systems will, of course, already be dissolved in a solvent.

The amount of halogenated phenol that needs to be employed as a molecular weight reducing agent varies with the type of halogenated phenol being employed, with the catalyst system, with the polymerization temperature, and with the desired molecular weight of the high cis-1,4-polybutadiene rubber being synthesized. For instance, if a high molecular weight rubber is desired, then a relatively small amount of halogenated phenol is required. On the other hand, in order to reduce molecular weights substantially, a relatively large amount of the halogenated phenol will need to be employed. Generally, greater amounts of the halogenated phenol are required when the catalyst system being utilized contains hydrogen fluoride or is an aged catalyst which contains boron trifluoride. Extremely effective halogenated phenols, such as pentafluorophenol, can be used in lower concentrations than less effective halogenated phenols and will nevertheless suppress molecular weights to the same degree.

As a general rule the molar ratio of the halogenated phenol to the organoaluminum compound will be within the range of about 0.01:1 to about 1:1. The molar ratio of the halogenated phenol to the organoaluminum compound will more typically be within the range of about 0.05:1 to about 0.8:1. In most cases desired molecular weights can be attained by employing a molar ratio of the halogenated phenol to the organoaluminum compound which is within the range of about 0.1:1 to about 0.6:1. Higher ratios of the halogenated phenol to the organoaluminum compound reduces molecular weights to a greater extent. However, larger ratios of the halogenated phenol to the organoaluminum compound also reduce yields. High yield can generally be attained with the molar ratio of the halogenated phenol to the organoaluminum compound is less than about 0.5:1. However, yields diminish substantially as the molar ratio of the halogenated phenol to the organoaluminum compound is increased above a ratio of about 0.6:1. For this reason, a molar ratio of the halogenated phenol to the organoaluminum compound of greater than about 0.8:1 will not normally be employed.

The temperatures utilized in the polymerizations of this invention are not critical and may vary from extremely low temperatures to very high temperatures. For instance, such polymerizations can be conducted at any temperature within the range of about −10° C. to about 120° C. The polymerizations of this invention will preferably be conducted at a temperature within the range of about 30° C. to about 90° C. It is normally preferred for the polymerization to be carried out at a temperature which is within the range of about 55° C. to about 75° C. Such polymerizations will normally be conducted for a period of time which is sufficient to attain a high yield which is normally in excess of about 80% and preferably in excess of about 90%.

The high cis-1,4-polybutadiene rubber made utilizing the techniques of this invention typically has a cis content in excess of about 95%. For example, the high cis-1,4-polybutadiene rubber made utilizing the techniques of this invention will typically have a cis content of about 97%, a trans content of about 2%, and a vinyl content of about 1%.

After the polymerization is completed, the high cis-1,4-polybutadiene rubber may be recovered from the resulting polymer solution (rubber cement) by any of several procedures. One such procedure comprises mixing the rubber cement with a polar coagulating agent, such as methanol, ethanol, isopropylalcohol, acetone, or the like. The coagulating agent can be added at room temperature or below whereupon the liquified low molecular weight hydrocarbons will vaporize. If desired, gentle heat may be applied to hasten the removal of low molecular weight hydrocarbons, but not sufficient heat to vaporize the polar coagulating agent. The vaporized low molecular weight hydrocarbon solvents can then be recovered and recycled. The coagulated rubber is recovered from the slurry of the polar coagulating agent by centrifugation, decantation or filtration.

Another procedure for recovering the high cis-1,4-polybutadiene rubber is by subjecting the rubber solution to spray drying. Such a procedure is particularly suitable for continuous operations and has the advantage that heat requirements are at a minimum. When such a procedure is used, the recovered polymer should be washed soon after recovery with a polar solvent in order to destroy the remaining active catalyst contained in the polymer. In such procedures the vaporized organic solvents are also easily recovered, but will normally require purification before being recycled.

The practice of this invention is further illustrated by the following examples which are intended to be representative rather than restrictive of the scope of the subject invention. Unless indicated otherwise, all parts and percentages are given by weight. Dilute solutions viscosities were determined in toluene at 30° C.

EXAMPLE 1-6

In this series of experiments pentafluorophenol was evaluated as a molecular weight reducing agent. In this series of experiments 500 grams of a 15% solution of 1,3-butadiene monomer in hexane was added to a series of quart (946 ml) polymerization bottles under a nitrogen atmosphere. The bottles were capped using a self-sealing gasket with a Teflon liner. Triisobutylaluminum was added with a hypodermic syringe followed by the addition of nickel octanoate. The molar ratio of the triisobutylaluminum to nickel octanoate was 40:1. After about 2 to 3 minutes the pentafluorophenol was added in the amount shown in Table I was added as a 0.12M solution. After allowing 2 or 3 minutes for the pentafluorophenol to react with the triisobutylaluminum, a hydrofluoric acid solution was added. A sufficient amount of hydrofluoric acid was added to attain a molar ratio of hydrofluoric acid to nickel octanoate of 100:1. The polymerization bottle was then placed in a constant temperature bath which was maintained at a temperature of 65° C. After a polymerization time of 1-2 hours, a short stop solution containing 1 phm (parts per hundred parts by weight of monomer) of rosin acid, 1 phm of 2,6-di-tertiary-butyl-para-cresol, which is also known as butylated hydroxy toluene (BHT), and 0.5 phm of triisopropanolamine was added. The polymer cement made was then hot air oven dried overnight.

The rubber samples which were recovered were evaluated to determine number average molecular weight, weight average molecular weight, and dilute solution viscosities. These results as well as yields and molecular weight distributions are reported in Table I.

TABLE I

| Ex | PFP:Al | Yield | Mn | Mw | MWD | DSV (dl/g) | Cold Flow (mg/min) |
|---|---|---|---|---|---|---|---|
| 1 | 0 | 99% | 163,000 | 703,000 | 4.3 | 3.83 | 0.26 |
| 2 | 0.12 | 97% | 133,000 | 529,000 | 4.0 | 3.03 | 0.68 |
| 3 | 0.24 | 93% | 80,000 | 457,000 | 5.8 | 2.44 | 1.45 |
| 4 | 0.36 | 87% | 57,000 | 333,000 | 5.8 | 2.05 | 1.76 |
| 5 | 0.48 | 81% | 38,000 | 293,000 | 7.7 | 1.83 | 3.18 |

TABLE I-continued

| Ex | PFP:Al | Yield | Mn | Mw | MWD | DSV (dl/g) | Cold Flow (mg/min) |
|---|---|---|---|---|---|---|---|
| 6 | 0.60 | 73% | 29,000 | 263,000 | 9.0 | 1.63 | 5.23 |

PFP:Al = molar ratio of pentafluorophenol to triisobutylaluminum
Mw = weight average molecular weight
Mn = number average molecular weight
Cold flow was measured at 50° C.

Inspection of the results presented in Table 1 show pentafluorophenol to be an extremely efficient molecular weight regulator. The number average molecular weight of the high cis-1,4-polybutadiene produced dropped sharply with increasing levels of pentafluorophenol, while the molecular weight distribution became broader. The molecular weight distribution of high cis-1,4-polybutadiene synthesized with conventional nickel based catalyst systems is typically within the range of about 4.3 to about 4.8. However, by utilizing the halogenated phenol as a molecular weight reducing agent the molecular weight distribution of the rubber produced could be increased to well over 4.8. in fact, in Examples 3 and 4 molecular weight distributions of greater than 5.0 were attained. In Examples 5 and 6 molecular weight distributions of greater than 7.0 and 9.0 were attained.

EXAMPLES 7-14

In this series of experiments para-fluorophenol was evaluated as a molecular weight reducing agent. The polymerizations were conducted in a series of four ounce (118 ml) polymerization bottles. The polymerization bottles were filled with 100 ml of a 13% solution of 1,3-butadiene monomer in hexane under a nitrogen atmosphere. Then triisobutylaluminum was added utilizing a hypodermic syringe followed by the addition of 0.02 phm of nickel octanoate. A sufficient amount of triisobutylaluminum was added to realize a molar ratio of triisobutylaluminum to nickel octanoate of 40:1. After 2-3 minutes, the para-fluorophenol was added as a 0.1M solution in hexane. After allowing another 2-3 minutes for the para-fluorophenol to react with the triisobutylaluminum, a solution of hydrofluoric acid was added. The molar ratio of hydrofluoric acid to nickel octanoate was 100:1. The polymerization bottles were then placed in a constant temperature bath which was maintained at 65° C. with the bottles being rotated end-over-end. The polymerization was allowed to proceed for 90 minutes. Then, the polymerization was short-stopped by the addition of 1.0 phm of rosin acid, 1.0 phm of BHT, and 0.5 phm of triisopropanolamine. The rubber cements prepared were subsequently dried overnight in a hot air oven. The molar ratio of para-fluorophenol to triisobutylaluminum, yield, and DSV is reported in Table II.

TABLE II

| Example | PFP:Al | Yield | DSV(dl/g) |
|---|---|---|---|
| 7 | 0 | 92% | 4.10 |
| 8 | 0.05 | 92% | 3.92 |
| 9 | 0.10 | 91% | 3.80 |
| 10 | 0.15 | 94% | 3.78 |
| 11 | 0.20 | 92% | 3.68 |
| 12 | 0.25 | 90% | 3.31 |
| 13 | 0.50 | 87% | 3.03 |

TABLE II-continued

| Example | PFP:Al | Yield | DSV(dl/g) |
|---------|--------|-------|-----------|
| 14 | 1.00 | 6% | ND |

PFP:Al = molar ratio of para-fluorophenol to triisobutylaluminum
DSV = dilute solution viscosity As can be seen by inspecting Table II, parafluorophenol is not as efficient as pentafluorophenol. However, some of this difference may be attributable to temperature differences because the quart polymerization bottles probably run somewhat hotter.

EXAMPLES 15-19

In a preferred embodiment of this invention, the trialkylaluminum component of the catalyst system is preformed with the halogenated phenol. By preforming the organoaluminum component of the catalyst system with the halogenated phenol, higher conversions can typically be attained. Better reproducibility of conversions and Mooney viscosities is also realized when the catalyst is preformed. The preforming of the catalyst can be carried out by slowly adding a solution of the halogenated phenol to a solution of the organoaluminum compound. The preformed organoaluminum/halogenated phenol component of the catalyst system can then be further diluted with additional organic solvent to the desired concentration.

In this series of experiments, the triisobutylaluminum component of the catalyst system was preformed with para-chlorophenol. The molar ratio of the para-chlorophenol to the triisobutylalumimum is shown in Table III. In polymerizations where the triisobutylaluminum component is preformed with the halogenated phenol, it is typically desirable to reduce the level of hydrofluoric acid employed in the catalyst. As a rule of thumb, the amount of hydrofluoric acid employed is reduced by one mole for every mole of para-chlorophenol employed.

These polymerizations were conducted in a series of quart (946 ml) polymerization bottles under a nitrogen atmosphere. The polymerization bottles were filled with 500 ml of 16.1% solutions of 1,3-butadiene monomer in hexane. The polymerization bottles were capped using a self-sealing gasket with a Teflon liner. The preformed triisobutylaluminum/para-chlorophenol component was added with a hypodermic syringe followed by the addition of nickel octanoate and hydrofluoric acid. Nickel octanoate was employed in all the experiments in this series at a level of 0.01 phm. The molar ratio of the triisobutylaluminum to the nickel octanoate was 40:1. The ratio of hydrofluoric acid to the triisobutylaluminum is shown in Table III.

The polymerization bottles were placed in a constant temperature bath which was maintained at a temperature of 65° C. After a polymerization time of about 90 minutes, a short stop solution was added at such a level to give 1 phm (parts per hundred parts by weight of monomer) of rosin acid, 1 phm of 2,6-di-tertiary-butyl-para-cresol, which is also known as butylated hydroxy toluene (BHT), and 0.5 phm of triisopropanolamine was added. The polymer cement made was then hot air oven dried overnight.

The rubber samples which were recovered were evaluated to determine yields and Mooney ML1+4(100° C.) viscosities. As can be seen, the Mooney viscosities of the polymers made were reduced with increasing amounts of the para-chlorophenol modifier.

TABLE IV

| Example | p-CL—P:Al | HF:Al | Yield (%) | ML1 + 4(100° C.) |
|---------|-----------|-------|-----------|------------------|
| 15 | 0 | 2.50 | 93 | 79 |
| 16 | 0.70 | 1.80 | 88 | 54 |
| 17 | 0.80 | 1.70 | 80 | 56 |
| 18 | 0.90 | 1.60 | 60 | 46 |
| 19 | 1.00 | 1.50 | 54 | 36 | p-Cl—P:Al = molar ratio of para-chlorophenol to triisobutylaluminum
HF:Al = molar ratio of hydrofluoric acid to triisobutylaluminum While certain representative embodiments and details have been shown for the purpose of illustrating the subject invention, it will be apparent to those skilled in this art that various changes and modifications can be made without departing from the scope of the present invention.

I claim:

1. A process for producing high cis-1,4-polybutadiene having a reduced molecular weight and broad molecular weight distribution which comprises polymerizing 1,3-butadiene in the presence of (a) an organonickel compound wherein the organonickel compound is a nickel salt of a carboxylic acid, (b) an organoaluminum compound wherein the organoaluminum compound is a trialkylaluminum compound, (c) a fluorine containing compound which is selected from the group consisting of hydrogen fluoride and hydrogen fluoride complexes, and (d) a halogenated phenol wherein the molar ratio of the halogenated phenol to the organoaluminum compound is within the range of about 0.01:1 to about 1:1.

2. A process as specified in claim 1 wherein the halogenated phenol is pentafluorophenol.

3. A process as specified in claim 1 wherein the halogenated phenol is para-fluorophenol.

4. A process as specified in claim 1 wherein the halogenated phenol is para-chlorophenol.

5. A process as specified in claim 1 wherein the molar ratio of the halogenated phenol to the organoaluminum compound is within the range of 0.05:1 to about 0.8:1.

6. A process as specified in claim 5 wherein the halogenated phenol is selected from the group consisting of para-fluorophenol, para-chlorophenol, and para-bromophenol.

7. A process as specified in claim 5 wherein the halogenated phenol is selected from the group consisting of pentafluorophenol, pentachlorophenol, and pentabromophenol.

8. A process as specified in claim 1 wherein the molar ratio of the halogenated phenol to the organoaluminum compound is within the range of about 0.1:1 to about 0.6:1.

9. A process as specified in claim 1 wherein the halogen in the halogenated phenol is selected from the group consisting of fluorine, chlorine, and bromine.

10. A process as specified in claim 1 wherein said halogenated phenol has the structural formula:

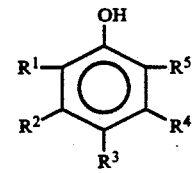

wherein $R^1$, $R^2$, $R^3$, $R^4$, and $R^5$ can be the same or different and represent hydrogen or a halogen, with the proviso that at least one member selected from the group consisting of $R^1$, $R^2$, $R^3$, $R^4$, and $R^5$ is a halogen.

11. A process as specified in claim 10 wherein said halogen is selected from the group consisting of fluorine, chlorine and bromine.

* * * * *